(12) United States Patent
Niessner et al.

(10) Patent No.: US 11,041,070 B2
(45) Date of Patent: Jun. 22, 2021

(54) POLYMER COMPOSITIONS FOR SHRINK-WRAP FILMS

(71) Applicant: INEOS STYROLUTION GROUP GMBH, Frankfurt am Main (DE)

(72) Inventors: Norbert Niessner, Friedelsheim (DE); Michael Schuster, Erpolzheim (DE); Daniel Wagner, Bad Duerkheim (DE); Konrad Knoll, Mannheim (DE)

(73) Assignee: INEOS STYROLUCTION GROUP GMBH, Frankfurt am Main (DE)

( * ) Notice: Subject to any disclaimer, the term of this patent is extended or adjusted under 35 U.S.C. 154(b) by 231 days.

(21) Appl. No.: 16/471,827

(22) PCT Filed: Dec. 14, 2017

(86) PCT No.: PCT/EP2017/082761
§ 371 (c)(1),
(2) Date: Jun. 20, 2019

(87) PCT Pub. No.: WO2018/114569
PCT Pub. Date: Jun. 28, 2018

(65) Prior Publication Data
US 2020/0095416 A1    Mar. 26, 2020

(30) Foreign Application Priority Data

Dec. 23, 2016 (EP) .................... 16206594

(51) Int. Cl.
| | |
|---|---|
| *C08L 53/02* | (2006.01) |
| *B65D 75/00* | (2006.01) |
| *C08F 297/04* | (2006.01) |
| *C08J 5/18* | (2006.01) |

(52) U.S. Cl.
CPC ............ *C08L 53/02* (2013.01); *B65D 75/002* (2013.01); *C08F 297/044* (2013.01); *C08J 5/18* (2013.01); *C08J 2353/02* (2013.01); *C08J 2453/02* (2013.01); *C08J 2491/00* (2013.01); *C08L 2203/162* (2013.01); *C08L 2205/025* (2013.01); *C08L 2205/03* (2013.01); *C08L 2207/322* (2013.01)

(58) Field of Classification Search
CPC ..... C08L 53/02; B65D 75/002; C08F 297/044
See application file for complete search history.

(56) References Cited

U.S. PATENT DOCUMENTS

| | | | |
|---|---|---|---|
| 5,639,831 A  * | 6/1997 | Himes | ................. C08F 297/044 525/314 |
| 7,037,980 B2 | 5/2006 | Stacy et al. | |
| 2008/0269414 A1 | 10/2008 | Knoll et al. | |
| 2011/0098401 A1* | 4/2011 | Muller | ................. C08F 297/04 524/505 |
| 2015/0183917 A1* | 7/2015 | Knoll | ................. C08F 293/005 525/98 |

FOREIGN PATENT DOCUMENTS

| | | | |
|---|---|---|---|
| DE | 10306891 A1 | 8/2004 | |
| EP | 0436225 A1 | 7/1991 | |
| EP | 0852240 A1 | 7/1998 | |
| JP | H09235443 A | 9/1997 | |
| WO | 2012/055919 A1 | 5/2012 | |

* cited by examiner

*Primary Examiner* — Mark S Kaucher
(74) *Attorney, Agent, or Firm* — J.A. Lindeman & Co. PLLC

(57) ABSTRACT

Polymer compositions comprising styrene butadiene block-copolymers (SBC) can be used for shrink-wrap films, a stiff star-shaped SBC block copolymer A having two short branches of a single copolymer block $(B/S)_{Ai}$ and two long branches of the structure $S_t$-$[(B/S)_A]_n$-$(B/S)_{Ai}$ or $[(B/S)_A]_n$-$(B/S)_{Ai}$ are used in said polymer composition, and the production of shrink-wrap films and of multilayer films is described.

20 Claims, No Drawings

POLYMER COMPOSITIONS FOR SHRINK-WRAP FILMS

The invention relates to polymer compositions comprising styrene butadiene block-copolymers (SBC) for shrink-wrap films, a SBC block copolymer used for said polymer composition, and use of said polymer compositions for the production of shrink-wrap films and of multilayer films.

The use of styrene-butadiene block copolymers as heat-shrinkable films has been disclosed in EP-A 436 225. Said block copolymers are linear or star shaped and comprise beside vinyl aromatic polymer blocks also polymer blocks B composed mainly of a conjugated diene. The films are stretched to over 500% by heating to from 60 to 100° C., and the stretched state is set after cooling to room temperature. After printing, these films can be processed to give pods and by way of example placed over a bottle and reshrunk in a heat tunnel at from 70 to 90° C., whereupon the film clings to the bottle.

Shrink films are films intended to shrink almost to their initial dimensions when applied under hot conditions, but at the same time are intended to have high storage stability, meaning that they are intended to exhibit no shrinkage at temperatures around 20-40° C. Furthermore, they are intended not only to have high transparency but also to have high stiffness and strength.

EP-A 852240 describes linear styrene-butadiene block copolymers and mixtures thereof which after orientation in hot conditions, are claimed to have a reduced level of spontaneous shrinkage at 30° C. Preferred are SBCs of the structure A-B-B where A is a polymer chain of a vinyl aromatic monomer and B is a random copolymer chain of a vinyl aromatic monomer and a conjugated diene. The weight ratio S/B is 60:40 to 90:10.

U.S. Pat. No. 7,037,980 describes star-shaped butadiene-styrene block copolymers having random styrene-butadiene blocks; which, when compared with pure styrene blocks of identical molecular weight, exhibit a reduced glass transition temperature and thus improved shrinkage behavior on exposure to heat. Said block copolymers further comprise a conjugated diene block B (structure (B/S)-B-CA), or inter alia are block copolymers of the structure (B/S)1-(B/S)2-(B/S)3-(B/S)4-(B/S)5-CA, wherein (B/S) is a random monovinylarene/conjugated diene block; CA is a coupling agent residue; (B/S)1 and (B/S)2 each have a conjugated diene content from about 2.5 wt % to about 10 wt %; and (B/S)3, (B/S)4, and (B/S)5 each have a conjugated diene content from about 30 wt % to about 70 wt %.

WO 2012/055919 describes star-shaped elastomeric SBC block copolymers and mixtures thereof having at least 2 different arms where at least one arm comprises a pure vinylaromatic hard block S and a soft vinylaromatic/diene polymer block (B/S) having a $T_g$ below 0° C. Preferred are stars having 3 or 4 arms, where two S1-(B/S)-S2 arms and one or two hard block polymers S have been bonded. Said elastomeric SBC block copolymers can be used for various applications, in particular for foils.

US 2008/0269414 and US 2011/098401 describe mixtures of styrene-butadiene block copolymers A and B which can be processed to give heat-shrinkable films with high shrinkage capability and with high stiffness/strength. Preferred are linear SBC copolymers A of the structure S-(B/S)$_A$-S or such as a single copolymer block (B/S)$_A$ wherein (B/S)$_A$ is a random copolymer hard block composed of 65 to 95 wt.-% vinyl aromatic monomers and 5 to 35 wt.-% dienes and S is a vinylaromatic polymer hard block having a molar mass Mw of 50000 to 500000 g/mol. Preferably the SBC block copolymers B are star shaped having random copolymer blocks (B/S)$_B$ each composed of 20 to 60 wt.-% vinylaromatic monomers and 80 to 40 wt.-% dienes and at least terminal hard blocks $S_1$ and $S_2$ with different molecular weight (US 2008/0269414), or, the SBC block copolymers B are preferably star-shaped having short branches of structure $S_e$(B/S)$_B$ or $S_e$-(B/S)$_B$-$S_s$ and long branches of structure (B/S)$_A$-$S_i$-(B/S)$_B$ or (B/S)$_A$-$S_i$(B/S)$_B$-$S_s$ linked by way of the soft blocks (B/S)$_B$ or (B/S)$_B$-$S_s$ (US 2011/098401 A1), wherein $S_e$, $S_i$ are long and $S_s$ is a short vinylaromatic polymer block. Particularly good shrinkage values are obtained if the content of white oil in the mixture is from 1.5 to 3.5% by weight.

Shrink wrap films produced according to said prior art are still in need for improvement with respect to the natural shrinkage, stiffness and toughness.

Therefore it is one object of the invention to provide a polymer composition based on SBCs for shrink wrap films with reduced natural shrinkage and sufficient ultimate shrinkage at temperatures of about 90° C., higher stiffness and sufficient toughness. It is a further object of the invention to provide stiff block copolymers based on SBCs having an increased space-time yield in the production facilities and a reduced deposit formation of lithium salts which can be used in polymer compositions based on SBCs for shrink wrap films.

One object of the invention is a star-shaped block copolymer A having:
two short branches consisting of a single copolymer block (B/S)$_{Ai}$ made from 65 to 95 wt.-% vinylaromatic monomers and 35 to 5 wt.-% dienes and having a glass transition temperature Tg$_A$ in the range from 40 to 90° C., and
two long branches of the structure $S_t$-[(B/S)$_A$]$_n$-(B/S)$_{Ai}$ or [(B/S)$_A$]$_n$-(B/S)$_{Ai}$, linked (to one another via a coupling agent) by way of the inner blocks (B/S)$_{Ai}$, where the block $S_t$ is made from 95 to 100 wt.-% of vinylaromatic monomers and 0 to 5 wt.-% of dienes; the block [(B/S)$_A$]$_n$ consists of one or more different or identical copolymer blocks (B/S)$_A$, each made from 65 to 95 wt.-% vinylaromatic monomers and 35 to 5 wt.-% dienes and have a glass transition temperature Tg$_A$ in the range from 40 to 90° C.; n is a regular number of at least 1, preferably n=2 to 10, more preferably n=2 or 3, most preferably n=2, and the block (B/S)$_{Ai}$ is as defined above, wherein
the block (B/S)$_{Ai}$ has a number average molar mass $M_n$ in the range of from 5000 to 15000 g/mol and the entire block [(B/S)$_A$]$_n$ has a number average molar mass $M_n$ of 50000 to 150000 g/mol.

In the context of the invention, the average molar mass Mn is determined by GPC according to ISO 16014-3:2012 (Low T<60° C. size exclusion with relative calibration method against polystyrene standards). Wt.-% means percent by weight.

In the context of the invention "diene" means a conjugated diene. Butadiene means 1,3-butadiene.

In the context of the invention the glass transition temperature (Tg) is determined by DSC based on DIN EN ISO 11357-2:2014-07, with evaluation of the 2nd heating cycle after quick cooling from 180° C. with a heating rate of 20 K/min.

Block Copolymer A

Preferably the number-average molar mass Mn of the copolymer block (B/S)$_{Ai}$ is in the range of from 6000 to 12000 g/mol.

Preferably the number-average molar mass Mn of the entire block [(B/S)$_A$]$_n$ is in the range of from 60000 to 130000 g/mol, more preferably 70000 to 120000 g/mol, most preferred 70000 to 100000 g/mol.

Preferably the number-average molar mass Mn of the block $S_t$ is in the range from 3000 to 8000 g/mol.

The block $[(B/S)_A]_n$ consists of n, respectively one or more, preferably 2 to 10, more preferably 2 or 3, most preferably two different or identical copolymer blocks $(B/S)_A$, where the blocks $(B/S)_A$ can differ in their molar masses and/or in their vinylaromatic/diene ratio.

Preferably, the block $[(B/S)_A]_n$ has the structure $(B/S)_{A1}$-$(B/S)_{A2}$-$(B/S)_{A3}$ or more preferably $(B/S)_{A1}$-$(B/S)_{A2}$. In said structures the vinylaromatic/diene ratio can differ in the individual blocks B/S. Accordingly, the long branches preferably have the structure $S_t$-$(B/S)_{A1}$-$(B/S)_{A2}$-$(B/S)_{A3}$-$(B/S)_{Ai}$ or $(B/S)_{A1}$-$(B/S)_{A2}$-$(B/S)_{A3}$-$(B/S)_{Ai}$ or more preferably $(B/S)_{A1}$-$(B/S)_{A2}$-$(B/S)_{Ai}$ or in particular preferably $S_t$-$(B/S)_{A1}$-$(B/S)_{A2}$-$(B/S)_{Ai}$.

According to one embodiment the outer block $(B/S)_{A1}$ has a higher number average molar mass Mn than the block $(B/S)_{A2}$. According to said embodiment the number average molar mass Mn of the block $(B/S)_{A1}$ is preferably within the range from 30000 to 80000 g/mol; the number average molar mass Mn of the block $(B/S)_{A2}$ is preferably within the range from 20000 to 50000 g/mol.

It is preferable that—independently from each other—the copolymer blocks $(B/S)_A$, and $(B/S)_{Ai}$ are made from 85 to 93 wt.-% of a vinylaromatic monomer, in particular styrene, and from 7 to 15 wt.-% of a diene, in particular isoprene or butadiene. Particular preference is given to butadiene.

The glass transition temperature of the copolymer blocks $(B/S)_A$, and $(B/S)_{Ai}$ is preferably in the range from 50 to 80° C., particularly preferably from 60 to 75° C.

Particularly suitable stiff block copolymers A are made from 86 to 94% by weight, preferably from 88 to 92% by weight, of vinylaromatic monomers, in particular styrene, and of from 6 to 14% by weight, preferably from 8 to 12% by weight, of diene, in particular butadiene, based in each case on the entire block copolymer.

Preference is given to block copolymers A which comprise (or consist of) copolymer blocks $(B/S)_A$ and $(B/S)_{Ai}$ composed of polymerized vinylaromatic monomers and of dienes, with random distribution. These can by way of example be obtained by anionic polymerization using alkyl-lithium compounds in the presence of randomizers, such as tetrahydrofuran, or potassium salts. Preference is given to use of potassium salts where the molar ratio of anionic initiator to potassium salt is in the range from 25:1 to 60:1, particularly preferably from 30:1 to 40:1. This method can at the same time achieve a low proportion of 1,2 linkages of the butadiene units. Suitable potassium salts are K alcoholates, in particular those soluble in the polymerization solvent, e.g. tert-amyl alcoholate or triethylcarbinolate, or other C-rich tertiary alcoholates.

The proportion of 1,2 linkages of the butadiene units is preferably in the range from 8 to 15%, based on the entirety of the 1,2, 1,4-cis, and 1,4-trans linkages.

It is particularly preferable that the star shaped block copolymer A has the following (pseudo-linear) structure:

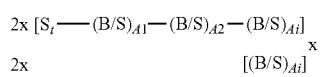

where $S_t$, $(B/S)_{A1}$, $(B/S)_{A2}$, and $(B/S)_{Ai}$ are as defined above and X is a coupling center, which is formed by reaction of the living anionic polymer chain ends (=linked by way of the blocks $(B/S)_{Ai}$) with a polyfunctional coupling agent. Said polyfunctional coupling agent can generally be any suitable polyfunctional compound. It is preferably selected from epoxidized vegetable oils, in particular epoxidized linseed oil or epoxidized soybean oil.

In the case of polymers prepared anionically, the molecular weight is controlled by way of the ratio of amount of monomer to amount of initiator. However, initiator can also be added repeatedly after monomer feed has taken place, the result then being a bi- or multimodal distribution. The molecular weights are usually determined by means of gel permeation chromatography (GPC) in THF as solvent, using polystyrene as standard. In the case of anionic polymerization weight-average molecular weight is approximately identical with number-average molecular weight.

The star shaped block copolymers A of the invention are produced via anionic polymerization generally in a nonpolar solvent, where the initiation process uses an initiator which is generally an organometallic compound. The production process in the invention uses addition of at least one coupling agent, generally at the end of the polymerization reaction, where a portion of the at least one initiator is added at the start of the polymerization reaction and the remaining portion of the initiator is added at a subsequent juncture.

The process of the invention permits production of the specific block copolymers A of the invention which in particular feature star-shaped molecular architecture with two identical short and two identical long branches of the star.

Suitable initiators in the anionic polymerization reaction are organometallic compounds, preferably compounds of the alkali metals, particularly preferably of lithium. Examples of initiators are methyllithium, ethyllithium, propyllithium, n-butyllithium, sec-butyllithium, and tert-butyllithium. The organometallic compound is generally added in the form of solution in a chemically inert hydrocarbon. The amount added depends in principle on the desired molar mass of the polymer, but is generally from 0.002 to 5 mol %, based on the monomers.

The above amount of initiator is based on the total amount of the initiator used which—as mentioned above—is added in at least two batches. Solvents used are preferably aliphatic hydrocarbons, such as cyclohexane or methylcyclohexane.

The anionic polymerization reaction also generally uses addition of a polar cosolvent (as randomizer), and it is believed here that the cosolvent acts as Lewis base in relation to the metal cation of the initiator. Preferred Lewis bases are polar aprotic compounds such as ethers and tertiary amines. Examples of particularly effective ethers are tetrahydrofuran and aliphatic polyethers, such as ethylene glycol dimethyl ether and diethylene glycol dimethyl ether. Tertiary amines that may be mentioned are triethylamine, tributylamine, and pyridine. The amount of the polar cosolvent added to the nonpolar solvent is by way of example from 0.5 to 5% by volume. Particular preference is given to an amount of from 0.1 to 0.6% by volume of tetrahydrofuran. An amount of from 0.2 to 0.4% by volume is very particularly preferred in many instances.

The amount added of, and the structure of, the Lewis base determine the copolymerization parameters and the proportion of 1,2- and 1,4-linkages of the diene units. The resultant rubbery block copolymers generally have a proportion of from 20 to 80% of 1,2-linkages and from 80 to 20% of 1,4-linkages, based on all of the diene units.

Preferably, a soluble potassium salt is added (as randomizer)—instead of the cosolvent—and is in particular a potassium alcoholate. It is believed here that the potassium salt interacts by metal exchange with the lithium-carbanion ion pair, thus forming potassium-carbanion compounds which preferentially form adducts with the vinylaromatic monomer, particularly preferably styrene, whereas the lithium-carbanion compounds preferentially form adducts with the diene, particularly preferably butadiene. Since potassium-carbanion compounds are substantially more reactive, even a small fraction, namely from 1/10 to 1/50, is sufficient, together with the predominating lithium-carbanion compounds to give a similar average probability of incorporation of vinylaromatic monomers, particularly preferably styrene, and of dienes, particularly preferably butadiene. Preference is given to use of potassium salts where the molar ratio of anionic initiator to potassium salt is in the range from 25:1 to 60:1, preferably from 30:1 to 40:1. Particularly preferably selected is a molar lithium/potassium ratio of from 33 to 39 in order to achieve approximately identical incorporation of vinylaromatic monomer, preferably styrene, and diene, preferably butadiene.

It is moreover believed that during the polymerization procedure there is frequent metal exchange between the living chains and also between a living chain and the dissolved salt, and that the same chain forms an adduct on one occasion preferentially with a vinylaromatic monomer, particularly preferably styrene, and in turn on another occasion with a diene, particularly preferably butadiene. The resultant copolymerization parameters are then approximately the same for the vinylaromatic monomer and the diene. Suitable potassium salts are particularly potassium alcoholates, in particular those soluble in the polymerization solvent, e.g. tertiary alcoholates having at least five carbon atoms such as tert-amyl alcoholate or triethylcarbinolate, or other C-rich tertiary alcoholates.

Examples of typical corresponding alcohols are 3-ethyl-3-pentanol and 2,3-dimethyl-3-pentanol. Tetrahydrolinalool (3,7-dimethyl-3-octanol) and 2-methyl-2-butanol (tert-amylalcohol) prove to be particularly suitable. Other compounds also suitable in principle alongside the potassium alcoholates are other potassium salts which are inert toward alkyl metal compounds. Mention may be made of dialkylpotassium amides, alkylated diarylpotassium amides, alkyl thiolates, and alkylated aryl thiolates. The block copolymers A produced with potassium salts as randomizers generally have a low proportion of from 8 to 15% of 1,2-linkages and from 92 to 85% of 1,4-linkages, based on all of the diene units.

The polymerization temperature is generally from 0 to 100° C., preferably from 30 to 90° C., particularly preferably from 50 to 90°. The polymerization reaction is generally carried out in a plurality of stages, where the initiator is added in a plurality of batches, using a double initiation process. By way of example, the process begins by producing the hard block $S_r$. A portion of the monomers is used as initial charge in the reactor, and the polymerization reaction is initiated via addition of a portion of the initiator. In order to achieve a defined chain structure that can be calculated from the amount of monomer and of initiator added, it is advisable to achieve high conversion (above 99%) in the process before the second monomer addition takes place. However, this is not essential.

The sequence of monomer addition depends on the selected block structure. In the case of a batch process, it is preferable to begin by using all of, or a portion of, the solvent, such as cyclohexane, as initial charge, and then to use, as initial charge, the amount of initiator, such as sec-butyllithium, that is required to establish the desired molar mass, plus what is known as a titration amount, which serves to destroy traces of impurities in the solvent and in the tank. It is then preferable to add the potassium salt, such as potassium tert-amyl alcoholate, preferably dissolved in cyclohexane, or to add the complexing solvent, such as THF to the reactor, and then—in case of long branches with a terminal block $S_r$—to add the first amount of vinylaromatic monomer, in order to produce the block $S_r$. Diene and vinylaromatic monomer are then added, preferably simultaneously.

The addition can take place in a plurality of portions optionally together with further solvent, e.g. for improved heat dissipation, and as a function of the desired constitution. The random structure, and the constitution, of the block $(B/S)_{A1}$ are determined via the quantitative proportion of diene with respect to vinylaromatic compound, the concentration of the potassium salt, if a potassium salt is used, and the concentration and chemical structure of the Lewis base used as co-solvent, if a Lewis base is used, and also the temperature.

Further blocks $(B/S)_{A2}$, $(B/S)_{A3}$ etc. can then be polymerized onto the growing polymer chain via addition of diene and vinylaromatic monomers. Preferably only the block $(B/S)_{A2}$ is then polymerized onto the growing polymer chain. Then a second initiation process, i.e. the second addition of the initiator, takes place prior to the addition of the diene and vinylaromatic monomers used for polymerizing the block $(B/S)_{Ai}$ onto the growing polymer chain.

In that case of double initiation in the same reactor, the molar mass of the newly initiated polymer (=block $(B/S)_{Ai}$) and of the block $(B/S)_{Ai}$ polymerized onto the growing polymer chain is practically identical.

According to the process of the invention, coupling with a coupling agent takes place after the last addition of diene and vinylaromatic monomer, and the plurality of polymer blocks $(B/S)_{Ai}$ are thus bonded to one another, and the block copolymer A of the invention having star-shaped molecular architecture is formed.

It is generally possible to use any polyfunctional compound as coupling agent. It is preferable that the coupling agent has been selected from epoxidized vegetable oils, such as epoxidized linseed oil or epoxidized soybean oil, silanes, such as alkoxysilanes, e.g. $Si(OMe)_4$, chlorosilanes, such as $SiCl_4$, $Si(Alkyl)_2Cl_2$, $Si(alkyl)Cl_3$, where alkyl is a $C_1$-$C_4$-alkyl moiety, preferably methyl, halides of aliphatic hydrocarbons, such as dibromomethane or bischloromethylbenzene, tin tetrachloride, polyfunctional aldehydes, such as terephthaldehyde, polyfunctional ketones, polyfunctional esters, such as carboxylic esters, e.g. ethyl acetate, diethyl succinate, dimethyl or diethyl adipate, polyfunctional anhydrides, oligo-epoxides, such as 1,4-butanediol glycidyl ether, activated diolefins, such as diisopropenylbenzene, divinylbenzene, or distyrylbenzene; preferred coupling agents are epoxidized vegetable oils, such as epoxidized linseed oil or epoxidized soy oil.

The coupling agent forms the coupling center X, which is formed by reaction of the living anionic chain ends with one of the abovementioned coupling agents.

The amount of coupling agent is calculated as a function of its functionality and of the amount of initiator used. It is preferable to add the amount of coupling agent needed for reacting all of the living chains, corresponding to the amount of active initiator (total amount of initiator minus titration amount). In the case of ester groups, account has to be taken of the fact that these form two living chains, whereas in contrast epoxides and haloalkanes and -silanes form one per functional group. By way of example, epoxidized soybean oil comprises fatty acids esterified in the form of triglyceride having predominantly one or two epoxy groups, and correspondingly predominantly forms bonds with three or four polymer chains, liberating the metal alcoholate of glycerol, since the carboxy group also forms bonds with two further chains.

It is possible to use the same initiator in each initiation step of the process of the invention for producing the block copolymer of the invention. However, it is also possible in principle to use various initiators.

The polymer concentration can be varied widely, but should preferably be selected in such a way that the temperatures at the end of the polymerization reaction for the individual blocks do not exceed values of 100° C. or if they exceed that value then at most for a short time, thus avoiding any significant premature thermal termination. Typical polymer concentrations after the coupling process, in the case of a batch process in a stirred tank, are from 10 to 50% by weight, preferably from 20 to 40% by weight, and particularly preferably from 25 to 35% by weight.

Instead of a stirred tank, preferably in combination with a reflux condenser, where the internal pressure of the tank is preferably lowered to cool the reaction solution via boiling and reflux of the solvent, it is in principle also possible to use other types of reactor, for example a loop reactor in combination with a cooled section, such as a heat exchanger, or to use a stirred tank in combination with an external heat exchanger. Instead of producing the block copolymers A of the invention in a batch process, they can be produced in a continuous process via, for example, arrangement in series of the reactors listed above in various combinations, or in a tubular reactor with preferably static mixing elements, or via a combination of tubular reactor and the reactors listed above. The number of reaction zones is preferably the same as the number of different monomer additions plus the coupling agent addition.

At the start, and at the appropriate points, the initiator system, generally comprising initiator and randomizer and optionally further solvent, is additionally mixed; it is preferable here to add the solvent to the monomer feeds so that the monomer is in dilute form before it reaches the reactor.

In one preferred embodiment, the polymer concentration is kept constant in the range from 15 to 35% by weight along the reactor cascade. In another preferred embodiment, the polymer concentration is increased to from 36 to 50% by weight through the final monomer addition.

Thus, the process according to the present invention is characterized by the following features:
a) a double initiation,
b) a coupling step after the last (=(n+1)), preferably the third addition and polymerization of a vinylaromatic monomer and a diene, and
c) the second initiation process placed before the last, preferably the third, addition and polymerization of a vinylaromatic monomer and a diene.

The molar ratio of the first and the second initiation process also plays a part in the process of the invention in respect of the structure of the block copolymer of the invention (initiation ratio). In the case of the star according to the invention having four arms, preference is given to a ratio between 1.10:1 and 2.50:1, where, on average, two $S_r$-$(B/S)_{A1}$-$(B/S)_{A2}$-$(B/S)_{Ai}$ branches and two $(B/S)_{Ai}$ branches polymers have been bonded (pseudolinear architecture), when the final monomer addition after the second initiation process is addition of a vinylaromatic monomer and a diene.

The initiation ratio—for double initiation—is generally from 10:1 to 1:10, preferably from 4:1 to 1:4, particularly preferably from 1:1 to 2.5:1.

The further work-up of the block copolymer of the invention takes place by conventional processes. It is advisable here to operate in a stirred tank and, after the coupling process, optionally use a small amount of alcohol, such as isopropanol, to protonate the possible small amounts of residual carbanions and the polymer-bonded alcoholates which may have been produced in the coupling step, in order to avoid formation of deposits in the tank and discoloration of the product, and to lower the viscosity of the solution, and, prior to further work-up, to use $CO_2$/water in a conventional manner to acidify the product slightly, so that the product subsequently obtained is glass-clear with no color tinge. It is also useful to stabilize the polymer with a free-radical scavenger or preferably with a combination of free-radical scavengers (e.g. C-free-radical scavengers, such as α-tocopherol (vitamin E), Sumilizer® GM and Sumilizer® GS, in combination with O-free-radical scavengers, such as Irganox® 1010 and Irganox® 1076) and with a secondary oxidation inhibitor (e.g. commercially available products preferably based on phosphite, an example being triisononylphenyl phosphite (TNPP) or Irgafos® 168), and use the conventional processes to remove the solvent, and extrude and pelletize the product.

One preferred process for removing the solvent is to decrease the concentration of the solvent in stages, where, if the polymerization reaction uses a batch process, the solution is advantageously first placed into intermediate storage in a buffer tank, and then is preferably after passage through a pump heated by way of one or more heat exchangers in series to a temperature which is preferably from 100 to 140° C. above the boiling point of the solvent (this being from 180 to 220° C. in the case of cyclohexane), in order then after passage through a pressure-retention valve to be transferred via a short pipe with vapor velocities which are preferably from 100 to 350 m/s into a depressurization vessel of which the pressure and temperature are preferably adjusted in such a way that the solvent just begins to condense and the surface has a coating of a solvent film, i.e. is not dry; for cyclohexane as solvent, it is preferable here to select temperatures of from 100 to 140° C. and pressures of from 1.6 to 4.3 bar.

The solvent vapor is preferably discharged upward out of the depressurization vessel, and condensed and passed for work-up, while the polymer solution, the concentration of which is now about 70-95%, gives a precipitate in the form of flakes on the base of the vessel, from where it can be conveyed onward by way of example by a gear pump into the next heat exchanger and can be reheated, preferably to from 170 to 230° C. The solution is then again depressurized by way of a pressure-retention valve onto the screws of a preferably twin-screw extruder, where the solvent vapor is discharged by way of vent domes upstream of and downstream of the polymer feed point. The concentration of the solvent is then preferably further reduced in extruder segments with barrier screw elements which seal against one another, while the vacuum continues to improve and upstream of the extruder head is preferably from 1 to 30 mbar, and small amounts of water are preferably injected, until the solvent content achieved is preferably <3000 ppm, particularly preferably <2000 ppm.

At the end of the extruder, the melt can be either strand-pelletized or underwater-pelletized, preference being given here to the underwater pelletization process. However, it is also possible to remove the solvent by way of other processes, for example by way of what is known as a Filmtruder in combination optionally with an extruder, or via steam stripping, as is conventional in the case of most styrene-based thermoplastic elastomers. In this case, polymer flakes are obtained. The pellets or the flakes can, like other types of rubber, be protected from adhesion by using an antiblocking agent, such as Acrawax®, Besquare®, Aerosil®, and/or tricalcium phosphate.

A particular feature of the process of the invention is that the block copolymer A of the invention can be produced with good space-time yields. The space-time yield (STY) for a batch polymerization process, i.e. from the juncture at which the first monomer charge has been combined with the first initiator charge until conclusion of the coupling process, i.e. the juncture at which optional addition of alcohol and evacuation of the reactor can be started, is generally from 0.5 to 3 h, preferably from 1 to 2.5 h.

Block copolymers A according to the invention are stiff compounds which can preferably be used for the production of shrink films.

One further subject of the invention is a polymer composition comprising (or consisting of) components (a), (b), (c) and (d):
- a) 45 to 100 wt.-% of component a) consisting of:
  - a1) 20 to 80 wt.-%, preferably 30 to 65 wt.-% of at least one star-shaped block copolymer A as defined above, and
  - a2) 80 to 20 wt.-%, preferably 70 to 35 wt.-% of at least one star-shaped block copolymer B, which has (in essence)
    short branches of structure $S_e$-$(B/S)_B$ and at least one, preferably one, long branch of structure $(B/S)_{Ae}$-$S_i$-$(B/S)_B$, linked (to one another via a coupling agent) by way of the blocks $(B/S)_B$, or
    short branches of structure $S_e$-$(B/S)_B$-$S_s$ and at least one, preferably one, long branch of structure $(B/S)_{Ae}$-$S_i$-$(B/S)_B$-$S_s$; linked (to one another via a coupling agent) by way of the blocks $S_s$;
    wherein the polymer blocks $S_e$ and $S_i$ are identical; the (hard) polymer blocks $S_e$, $S_i$ and $S_s$ are made from 95 to 100 wt.-% of vinylaromatic monomers and of from 0 to 5 wt.-% of dienes; the copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C.; and the copolymer blocks $(B/S)_B$ are each made from 20 to 60 wt.-% vinylaromatic monomers and 80 to 40 wt.-% dienes and have a glass transition temperature $Tg_B$ in the range from −80° to 0° C.;
- b) 0 to 55 wt.-% of at least one further thermoplastic polymer TP other than block copolymers A and B;
- c) 0 to 0.8 wt.-% of at least one plasticizer; and
- d) 0 to 3 wt.-% of at least one further additive or processing aid different from c);

where the total amount of components (a) and, if appropriate, (b), (c) and (d) is 100% by weight, the glass transition temperature Tg is determined by DSC based on DIN EN ISO 11357-2:2014-07, with evaluation of the 2nd heating cycle after quick cooling from 180° C. with a heating rate of 20 K/min. Wt.-% means percent by weight. In one embodiment of the invention, the composition of the invention comprises components (a) and (b) but also contains small amounts (at least 0.1 wt.-%) of components (c) and (d).

In the context of the invention "diene" means a conjugated diene.

The glass transition temperature Tg, in particular $Tg_A$ and $Tg_B$, is determined by DSC based on DIN EN ISO 11357-2:2014-07, with evaluation of the 2nd heating cycle after quick cooling from 180° C. with a heating rate of 20 K/min.

In the polymer composition according to the invention the amount of the component c) is preferably 0.10 to 0.80 wt.-%, more preferably 0.15 to 0.70 wt.-%, most preferably 0.20 to 0.60 wt.-%, in particular 0.20 to 0.50 wt.-%.

Preferably the polymer composition according to the invention comprises (or consists of:
- a) 45 to 99.90 wt.-%,
- b) 0.10 to 0.80 wt.-%
- c) 0 to 54.90 wt.-%
- d) 0 to 3 wt.-%.

More preferably the polymer composition according to the invention comprises (or consists of):
- a) 45 to 99.85 wt.-%,
- b) 0.15 to 0.70 wt.-%
- c) 0 to 54.85 wt.-%
- d) 0 to 3 wt.-%.

In a preferred embodiment, the polymer composition according to the invention comprises (or consists of):
- a) 45 to 99.8 wt.-%,
- b) 0.20 to 0.60 wt.-%
- c) 0 to 54.8 wt.-%
- d) 0 to 3 wt.-%.

If in the polymer composition according to the invention optional components (b), (c), or (d) are present, the minimum fraction of each is customarily 0.05 wt.-%.

Component (a)

Component a) preferably consists of a1) from 30 to 60 wt.-%, more preferably 33 to 50 wt.-%, most preferably 35 to 45 wt.-% of the at least one, preferably one, block copolymer A and a2) from 70 to 40 wt.-%, more preferably 67 to 50 wt.-%, most preferably 65 to 55 wt.-% of the at least one, preferably one, block copolymer B. The total amount of a1) and a2) is 100% by weight of (a).

Block Copolymer B

The number-average molar mass Mn of the hard polymer blocks $S_e$ or $S_i$ of the block copolymer B is generally in the range from 5000 to 30 000 g/mol. The blocks occur either terminally ($S_e$) or else between ($S_i$) the copolymer blocks $(B/S)_A$ and $(B/S)_B$. The short $S_i$ block maximizes incompatibility with the copolymer block $(B/S)_B$ acting as soft phase. This means that the intermediate phase that forms between the hard phase and the soft phase in the solid can be kept small. The proportion by weight of phases, that soften in the range of room temperature. i.e. from 10 to 40° C., can thus be kept small. The molecular weights are usually determined by means of gel permeation chromatography (GPC) in THF as solvent, using polystyrene as standard.

The star-shaped block copolymers B are prepared by sequential anionic polymerization method using double initiation.

The polymer blocks $S_e$ and $S_i$ have the same constitution and number-average molar masses Mn.

The block $S_s$ can have the same constitution as the blocks $S_e$ and $S_i$; its number average molar mass Mn is generally lower than 2500 g/mol.

The number-average molar mass Mn of the copolymer block $(B/S)_{Ae}$ is generally in the range from 30000 to 100000 g/mol, preferably in the range of from 40000 to 90000 g/mol, more preferably in the range from 50000 to 80000 g/mol. The constitution and properties of the copolymer block $(B/S)_{Ae}$ correspond to those of the copolymer block $(B/S)_A$ described for the block copolymer A above.

The number-average molar mass Mn of the copolymer blocks $(B/S)_B$ is generally in the range of from 5000 to 40000 g/mol; preferably from 7000 to 30000 g/mol, more preferably 9000 to 25000 g/mol.

The distribution of the polymerized units of vinylaromatic monomers and dienes in the copolymer blocks $(B/S)_B$ and $(B/S)_A$ of the block copolymer B is preferably random. These can by way of example be obtained by anionic polymerization using alkyllithium compounds in the presence of randomizers, such as tetrahydrofuran, or potassium salts as described above for the blocks $(B/S)_A$ and $(B/S)_{Ai}$ of the block copolymer A.

Preferably star-shaped block copolymer B has on average three short branches of structure $S_e\text{-}(B/S)_B$ and one long branch of structure $(B/S)_{Ae}\text{-}S_i\text{-}(B/S)_B$, linked to one another via a coupling agent by way of the blocks $(B/S)_B$, or has on average three short branches of structure $S_e\text{-}(B/S)_B\text{-}S_s$ and one long branch of structure $(B/S)_{Ae}\text{-}S_i\text{-}(B/S)_B\text{-}S_s$, linked to one another via a coupling agent by way of the blocks $S_s$.

Preferred are star-shaped block copolymers B where the proportion of the entirety of all of the blocks $(B/S)_B$ or $(B/S)_B\text{-}S_s$ (=soft phase) is from 30 to 37 wt.-%, preferably 32 to 36 wt.-%, more preferably 33 to 35 wt.-%, based on the entire star-shaped block copolymer B.

According to the invention all blocks "$(B/S)_B$" and, in case that prior to linkage a short block $S_s$ has been added, all blocks "$(B/S)_B\text{-}S_s$" constitute a soft phase. In the latter case the normally hard block $S_s$ is dissolved in the soft block "$(B/S)_B$ as it is too short to phase separate and therefore becomes part of the soft phase of the block "$(B/S)_B$.

More preferably the star-shaped block copolymer B has on average three short branches of structure $S_e\text{-}(B/S)_B$ and one long branch of structure $(B/S)_{Ae}\text{-}S_i\text{-}(B/S)_B$, linked to one another via a coupling agent by way of the blocks $(B/S)_B$, or which has on average three short branches of structure $S_e\text{-}(B/S)_B\text{-}S_s$ and one long branch of structure $(B/S)_{Ae}\text{-}S_i\text{-}(B/S)_B\text{-}S_s$, linked to one another via a coupling agent by way of the blocks $S_s$;

wherein the one or more (hard) polymer blocks $S_e$, $S_i$ and $S_s$ are made from 95 to 100 wt.-% of vinylaromatic monomers and 0 to 5 wt.-% of dienes, the blocks $S_e$ and $S_i$ have number-average molar masses $M_n$ in the range from 5000 to 30 000 g/mol, and the block $S_s$ has a number-average molar mass Mn lower than 2500 g/mol;

the (hard) copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C. and a number-average molar mass $M_n$ in the range of from 30000 to 100000 g/mol, and the (soft) copolymer blocks $(B/S)_B$ are each made from 20 to 60 wt.-% vinylaromatic monomers and 80 to 40 wt.-% dienes and have a glass transition temperature $Tg_B$ in the range from −80° to 0° C. and a number-average molar mass $M_n$ in the range of from 5000 to 40000 g/mol.

In particular preferred are the afore-mentioned star-shaped block copolymers B where the proportion of the entirety of all of the blocks $(B/S)_B$ or $(B/S)_B\text{-}S_s$ (=soft phase) is from 30 to 37 wt.-%, preferably 32 to 36 wt.-%, more preferably 33 to 35 wt.-%, based on the entire star-shaped block copolymer B.

Particularly suitable block copolymers B are made from 60 to 80% by weight, preferably from 67 to 73% by weight, of vinylaromatic monomers, in particular styrene, and of from 20 to 40% by weight, preferably from 25 to 31% by weight, of diene, in particular butadiene, based in each case on the entire block copolymer.

Preferred block copolymers B are star-shaped block copolymers B in which prior to linkage a short polystyrene block $S_s$ whose number-average molar mass Mn is lower than 2500 g/mol is incorporated to improve the toughness/stiffness ratio.

In particular preferred are star-shaped block copolymers B of the following structures:

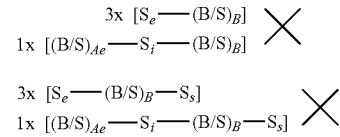

where $S_e$, $S_i$, $S_s$, $(B/S)_{Ae}$ and $(B/S)_B$ are defined above and X is a coupling center, which is formed by reaction of the living anionic polymer chain ends (=linked by way of the blocks $(B/S)_B$ or $(B/S)_B\text{-}S_s$) with a polyfunctional coupling agent.

Poly-functional coupling agents can be e.g. polyfunctional aldehydes, ketones, esters, anhydrides or epoxides, in particular epoxidized linseed oil or epoxidized soybean oil.

The preparation of asymmetrical star-shaped block copolymers by sequential anionic polymerization is commonly known and described in particular in U.S. Pat. No. 6,593,430 (col. 3, l. 1 to col. 4, l. 45).

Block copolymers B are tough compounds which are preferably used for the production of shrink-wrap films.

Plasticizer

The at least one, preferably one, plasticizer optionally used as component c) in the inventive polymer composition is a homogeneously miscible oil or oil mixture, in particular mineral oil (or white oil) or dioctyl adipate.

Mineral oil or white oil means any of various colorless, odorless, light mixtures of higher alkanes from a mineral source, particularly a distillate of petroleum.

According to the invention it is preferred that the polymer compositions comprise a plasticizer as component c).

Additives and/or Processing Aids

Additives and/or processing aids which can be optionally present as component d) in the inventive polymer composition are in particular stabilizers, antiblocking agents, dyes and UV absorbers. Preferred is the use of a stabilizer, in particular oxygen radical scavengers such as Irganox® 1010, Songnox® 1010, Irganox 1076, Irganox 565 and blends thereof, carbon radical scavengers such as Sumilizer® GS, Sumilizer GM and blends thereof, and/or secondary stabilizers such as Irgafos® 168. Said stabilizers are commercially available. The afore-mentioned stabilizers are preferably used in amounts of 0.01 to 0.5 wt.-%, more preferably 0.1 to 0.3 wt.-%. Furthermore preferred is the use of an antiblocking agent such as high impact polystyrene (HIPS). Antiblocking agents are preferably used in amounts of 0.1 to 1 wt.-%.

Thermoplastic Polymers

The polymer composition of the invention optionally comprises, as component b) from 0 to 55 wt.-%, preferably from 0 to 45 wt.-%, more preferably from 1 to 30 wt.-%, most preferably from 5 to 20 wt.-%, of at least one, preferably one or two, thermoplastic polymer other than block copolymers A and B.

Particularly suitable thermoplastic polymers are styrene polymers, such as standard polystyrene (GPPS), styrene-acrylonitrile copolymers (SAN), styrene-methyl methacrylate copolymers (S/MMA) or polymethacrylates, such as PMMA, polyesters, such as polyethylene terephthalate (PET), polyolefins, such as polyethylene or polypropylene, or polyvinyl chloride (PVC), or semicrystalline materials. Preferably used are styrene polymers, in particular GPPS.

It is also possible to use polyacrylates, such as PnBA, and other acrylate rubbers, ethylvinyl acetate polymers (EVA), etc. The thermoplastic polymers E can be admixed to improve stiffness, solvent resistance, printability, antiblocking properties, recyclability, and cling properties.

It is also possible to use thermoplastic elastomers (TPE), for example linear or star-shaped, hydrogenated or non-hydrogenated styrene-butadiene or styrene-isoprene block copolymers other than A and B, examples being two- and three-block copolymers. Suitable block copolymers are available commercially as Kraton® D, Kraton® G or Styroflex®. Addition of thermoplastic elastomers generally improves the toughness of the polymer composition of the invention.

Process for the Preparation of the Polymer Compositions

One further subject of the invention is a process for the preparation of the polymer composition according to the invention. The polymer compositions according to the invention can be obtained by mixing component a) and optional components b), c) and d) by any known method. However, it is preferable when the components are blended by melt mixing, for example conjoint extrusion, kneading or preferably a twin screw extruder, more preferably a counter-rotating twin screw extruder. For this process component a) can be used as a premixture of a1) and a2) or the individual block-copolymers A and B are used and blended as stated hereinbefore optionally by addition any of components the b), c) and d). This is usually done at temperatures in the range of from 160° C. to 300° C., preferably from 180° C. to 250° C., in particular 200 to 220° C.

A further subject of the invention is the use of the polymer compositions according to the invention for the production of films, in particular shrink films. The preparation of shrink films is commonly known. Processing may be carried out using the known processes for thermoplastic—in particular SBC—processing, in particular production may be effected by thermoforming, extrusion, injection molding, calendaring, blow molding, compression molding, preferably by extrusion to films.

The polymer compositions of the invention are highly transparent and are particularly suitable for the production of shrink films.

They are storage-stable, and exhibit very low natural shrinkage. "Natural shrinkage" means the spontaneous shrinkage behavior on storage lasting from a number of days up to 3 weeks in the range from 0 to 40° C.

The degree of ultimate shrinkage is high, permitting flexible adaptation to processing conditions, and also the wrapping of highly convex shapes. "Ultimate shrinkage" means shrinkage parallel or opposite to extrusion direction of the film by 65 to 75% when immersed for 10 sec in a 90° C. water bath after the film was prior stretched by 550% of its initial length (resp. parallel or opposite to extrusion direction).

In comparison to the prior art the polymer compositions of the invention exhibit a higher stiffness, in particular a higher E-modulus, and sufficient toughness.

The polymer composition of the invention is also particularly suitable for the production of multilayer films via coextrusion. The abovementioned thermoplastic polymers E are likewise suitable for the various layers, and the mixture of the invention can be used here in the form of backing layers or in the form of external layers. The additional layers are in particular used for surface modification, antiblocking properties, higher stiffness, or modified/reduced permeability.

The invention is further illustrated by the claims and the following Examples.

Analytical Methods

The melt mass flow index (=MFI, [ml/10 min]) is measured on a polymer melt at 220° C. and 5 kg load according to ISO 1133-1:2011.

All used solvents and monomers were dried and purified prior to use.

Block Copolymer A-C1 (Comparative Example (US 2011/098401, Block Copolymer A))

To prepare the linear styrene-butadiene block copolymer A-C1 of structure B/S, 2991 ml of cyclohexane were used as initial charge (ic) and titrated to the end point at 60° C. with 1.6 ml of sec-butyllithium (BuLi ic); 6.73 ml of a 1.4 M sec-butyllithium solution (BuLi 1), for initiation, and 2.29 ml of a 0.1175 M potassium tert-amyl alcoholate (PTA) solution, as randomizer, were then admixed and the mixture was cooled to 40° C. The polymerization reaction was carried out in two portions. For this, 450 g of styrene (S1) and 50 g of butadiene (B1) were respectively twice added simultaneously, and the maximum temperature was restricted by countercooling to 75° C. The living polymer chains were then terminated by addition of 0.72 ml of isopropanol, the mixture was acidified with $CO_2$/water, and a stabilizer solution was added. A vacuum oven was used to evaporate the cyclohexane.

Block copolymer A comprises 5% by weight of white oil.

|  | Ini 1 | Block 1 |  |
|---|---|---|---|
| Component | BuLi1 (1.4M) wt.-% (phm) | S1 wt.-% | B1 wt.-% |
| A-C1 | 0.506 | 90 | 10 |

Ini = initiator;
BuLi = sec-butyl lithium
phm = 'per hundred parts by weight of monomer' (wt.-% of component (initiator, coupling agent etc.) is calculated on the total mass of the monomers)

Block Copolymer A-1

A star-shaped block copolymer A-1 of the structure [$S_f$-(B/S)$_{A1}$-(B/S)$_{A2}$-(B/S)$_{Ai}$]$_2$X [(B/S)$_{Ai}$]$_2$ was prepared by sequential anionic polymerization of styrene (monomers S1 to S4) and butadiene (monomers B1 to B3) (cp. Table 1), and subsequent coupling using epoxidized soybean oil. 4785 ml of cyclohexane were used as initial charge (ic) and titrated to the end point at 60° C. with 1.6 ml of sec-butyllithium (BuLi ic), and cooled to 40° C. before adding 6.73 ml of a 1.4 M sec-butyllithium solution, (BuLi 1) for initiation (Ini1), and 2.29 ml of a 0.1175 M potassium tert-amyl alcoholate (PTA) solution, as randomizer. Next, the initiator mixture was then admixed and the mixture was cooled to 40° C. In a next step, 50 gram styrene was added and the polymerization reaction was allowed to run to complete monomer consumption (identified by a decrease in temperature of the reaction mixture). In a next step, 55 gram butadiene and 445 gram styrene were added simultaneously and the polymerization reaction was allowed to run to complete monomer consumption (identified by a decrease in temperature of the reaction mixture).

In a next step, again 25 gram butadiene and 225 gram styrene were added simultaneously and the polymerization reaction was allowed to run to complete monomer consumption (identified by a decrease in temperature of the reaction mixture). Next, the second initiator mixture (Ini 2) was added by dosing 2.69 ml of a 1.4M sec-butyllithium (BuLi 2) solution to the reaction, followed by 0.917 mL of a 0.1175 M potassium tert-amyl alcoholate (PTA) solution, as randomizer, while stirring. In a next step, again 20 gram butadiene and 180 gram styrene were added simultaneously and the polymerization reaction was allowed to run to complete monomer consumption (identified by a decrease in temperature of the reaction mixture).

Finally, 1.88 g of Edenol® D82 dissolved in 10 mL cyclohexane was added as coupling agent and allowed to react for 10 minutes. Finally, the mixture was terminated using 0.5 ml of isopropanol and acidified with $CO_2$/water, and a stabilizer solution (Irganox® 1010) was added.

Analytical data: MFI=12 ml/10 min

TABLE 1

| | Block copolymer A-1 (composition and sequence of addition) | | | | | | | |
|---|---|---|---|---|---|---|---|---|
| | Ini 1 BuLi1 (1.4M) | 1st block $S_t$ | 2nd block $(B/S)_{A1}$ | | 3rd block $(B/S)_{A2}$ | | Ini 2 BuLi 2 (1.4M) | 4th block $(B/S)_{Ai}$ | |
| SBC | wt.-% (phm) | S1 wt.-% | B1 wt.-% | S2 wt.-% | B2 wt.-% | S3 wt.-% | wt.-% (phm) | B3 wt.-% | S4 wt.-% |
| A-1 | 0.505 | 5 | 5.5 | 44.5 | 2.5 | 22.5 | 0.202 | 2 | 18 |

Block Copolymers B-C1, B-1 and B-2

The star-shaped block copolymers B-C1 (=block copolymer B of US 2011/098401 A1), B-1 and B-2 (block copolymers used in the inventive polymer compositions) were prepared in accordance with the data in table 2 by sequential anionic polymerization and subsequent addition of a coupling agent (epoxydized soybean oil). 358 wt % (phm) of cyclohexane was used as initial charge (ic) and titrated to the end point at 60° C. with 1.6 ml of sec-butyllithium (BuLi ic), and cooled to 40° C. before adding 0.506 wt.-% (phm) of a 1.4 M sec-butyllithium solution (BuLi 1), for initiation, and 0.1363 wt % (phm) of a 0.1175 M potassium tert-amyl alcoholate (PTA) solution, as randomizer. To form the copolymer blocks $(B/S)_A$ or $(B/S)_{Ae}$, the amounts stated in table 2 of styrene 1 (S1) and butadiene 1 (B1) were added.

After the polymerization reaction had ended, a second amount of initiator (Ini 2) of 0.866 wt.-% (phm) of a 1.4 M sec-butyllithium solution (BuLi 2), for the initiation of the second set of chains, and 0.3066 wt.-% (phm) of a 0.1175 M potassium tert-amyl alcoholate (PTA) solution, as randomizer, were added and mixed into the polymerization reaction. In succession, styrene 2 and a mixture of styrene 3 and butadiene 4 (copolymer block $(B/S)_B$), and also styrene 4, were added and polymerized. Finally, 0.188 wt.-% (phm) of Edenol® D82 were added as coupling agent in cyclohexane and the mixture was terminated using an excess (based on the total amount of sec-BuLi) of isopropanol.

Finally, the mixture is acidified with $CO_2$/water and stabilized with a solution of Irganox® 1010.

Analytical data: MFI=12 ml/10 min of block copolymers B-C1, B-1 and B-2

TABLE 2

| | Chemical composition of block copolymers B-C1, B-1 and B-2 | | | | | | | | |
|---|---|---|---|---|---|---|---|---|---|
| | Ini 1 BuLi 1 (1.4M) | Block 1 | | Ini 2 BuLi 2 (1.4M) | Block 2 | Block 3 | | Block 4 | |
| Component | wt % (phm) | S1 wt % | B1 wt % | wt % (phm) | S2 wt % | B2 wt % | S3 wt % | S4 wt % | Total soft phase |
| B-C1 | 0.385 | 33.34 | 3.7 | 0.866 | 22.53 | 28.9 | 9.71 | 1.8 | 40.41 |
| B-2 | 0.385 | 42.36 | 4.71 | 0.866 | 22.53 | 21.77 | 7.32 | 1.31 | 30.40 |
| B-1 | 0.385 | 40.09 | 4.45 | 0.866 | 21.33 | 24.44 | 8.21 | 1.47 | 34.12 |

Preparation of the Polymer Compositions

All blends were produced on a counter-rotating twin-screw extruder at from 200 to 220° C. and extruded to films of 250 μm thickness.

Subsequently, the films were cut into strips of at least 10 cm length and 5 cm width and placed in the damping jaws of a tensile testing machine with a free clamped length of 5 cm. The strips were subjected to tensile strain at 80° C. opposite to extrusion direction in the tensile testing machine by a stretching factor of 5.5, and rapidly cooled in the stretched state to 23° C.

All the mechanical data, i.e. Young's modulus and stress at break, were determined on the stretched films and parallel to the extrusion direction according to ISO 527-1:2012.

For the shrink data, i.e. natural shrinkage and ultimate shrinkage the width of the stretched strips was reduced to one third or they were cut into strips of width at least 1 cm. The narrow strips were used to determine the ultimate shrinkage values after 10 sec in a water bath at 90° C. To determine natural shrinkage, the strips were stored for a period of 4 days in a thermostat controlled 40° C. water bath.

Table 3 shows the obtained data for the polymer compositions of inventive examples 1 and 2, comparative example 1 (blend according to US 2011/098401 A1) and comparative examples 2 to 4. As mineral oil Winog® 70 Medical Oil from H&R was used.

TABLE 3

Mechanical and shrinkage properties on stretched films of inventive and comparative polymer compositions

| Blend No. | Polymer | | | | | Mineral oil | Young's Modulus | Strain at Break | Natural shrinkage | Ultimate Shrinkage 90° C., |
| --- | --- | --- | --- | --- | --- | --- | --- | --- | --- | --- |
| | B-C1 wt.-% | B-2 wt.-% | B-1 wt.-% | A-C1 wt.-% | A-1 wt.-% | wt.-%* (php) | MPa | % | 4 d, 40° C. % | 10 sec % |
| Cp. 1 | 60 | | | 40 | | 2.58 | 750 | 325 | 3.7 | 71 |
| 1 | | | 60 | | 40 | 0.50 | 989 | 256 | 2.6 | 73 |
| Cp. 2 | | 60 | | 40 | | 1.86 | 1184 | 347 | 3.0 | 73 |
| Cp. 3 | | 60 | | 40 | | 2.76 | 1243 | 233 | 3.5 | 71 |
| 2 | | 60 | | | 40 | 0.50 | 1516 | 250 | 2.8 | 74 |
| Cp. 4 | | 60 | | | 40 | 2.00 | 1140 | 67 | 2.8 | 75 |

Wt.-%* (php) = parts by weight based on 100 kg of the polymer component A

Table 3 shows that the polymer compositions of the invention, in particular those having a mineral oil content of 0.5 wt.-% (Ex. 1 and 2), are particularly suitable for the production of shrink films. They are storage-stable and in particular example 1 exhibits the lowest natural shrinkage (value <2.8% at 40° C., stored over a period of 4 days).

The degree of ultimate shrinkage at 90° C. is high (>70%), so permitting the wrapping of highly convex shapes. In comparison to the prior art (Cp. example 1) they exhibit a higher stiffness, in particular a higher E-modulus (values above 950 MPa parallel to the extrusion direction), and further a sufficient toughness (minimal strain at break at least 250% parallel to the extrusion direction). In contrast the properties of comparative examples 1 to 4 are significantly worse (higher natural shrinkage and/or too low strain at break).

The invention claimed is:

1. A star-shaped block copolymer A having:
    two short branches consisting of a single copolymer block $(B/S)_{Ai}$ made from 65 to 95 wt.-% vinylaromatic monomers and 35 to 5 wt.-% dienes and having a glass transition temperature $Tg_A$ in the range from 40 to 90° C., and
    two long branches of the structure $S_t-[(B/S)_A]_n-(B/S)_{Ai}$ or $[(B/S)_A]_n-(B/S)_{Ai}$, linked by way of the inner blocks $(B/S)_{Ai}$, where the block $S_t$ is made from 95 to 100 wt.-% of vinylaromatic monomers and 0 to 5 wt.-% of dienes; the block $[(B/S)_A]_n$ consists of one or more different or identical copolymer blocks $(B/S)_A$, each made from 65 to 95 wt.-% vinylaromatic monomers and 35 to 5 wt.-% dienes and have a glass transition temperature $Tg_A$ in the range from 40 to 90° C.; n is a regular number of at least 1, and the block $(B/S)_{Ai}$ is as defined above, wherein
    the block $(B/S)_{Ai}$ has a number average molar mass $M_n$ in the range of from 5000 to 15000 g/mol and the entire block $[(B/S)_A]_n$ has a number average molar mass $M_n$ of 50000 to 150000 g/mol.

2. The star-shaped block copolymer A according to claim 1, wherein the number-average molar mass Mn of the block $S_t$ is in the range from 3000 to 8000 g/mol.

3. The star-shaped block copolymer A according to claim 1, wherein the copolymer blocks $(B/S)_A$ and $(B/S)_{Ai}$ are composed of polymerized vinylaromatic monomers and of dienes with random distribution.

4. The star-shaped block copolymer A according to claim 1, wherein the block $[(B/S)_A]_n$ consists of 2 to 10 different copolymer blocks $(B/S)_A$, where the blocks $(B/S)_A$ differ in their molar masses and/or in their vinylaromatic/diene ratio.

5. The star-shaped block copolymer A according to claim 1, wherein the number-average molar mass Mn of the copolymer block $(B/S)_{Ai}$ is in the range of from 6000 to 12000 g/mol.

6. The star-shaped block copolymer A according to claim 1, wherein the copolymer blocks $(B/S)_A$, and/or $(B/S)_{Ai}$ are made from 85 to 93 wt.-% of a vinylaromatic monomer and from 7 to 15 wt.-% of a diene.

7. The star-shaped block copolymer A according to claim 1 of the structure:

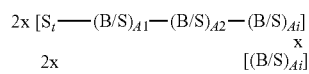

where $S_t$, and $(B/S)_{Ai}$ are as defined above, $(B/S)_{A1}$ and $(B/S)_{A2}$ are two different copolymer blocks $(B/S)_A$ as defined above, and X is a coupling center, which is formed by reaction of the living anionic polymer chain with a polyfunctional coupling agent.

8. A process for the preparation of the star-shaped block copolymer A according to claim 1, characterized by:
   a) a double initiation,
   b) a coupling step after the last addition and polymerization of a vinylaromatic monomer and a diene, and
   c) the second initiation process placed before the last addition and polymerization of a vinylaromatic monomer and a diene.

9. A polymer composition comprising components (a) and optionally (b), (c), and (d):
   a) 45 to 100 wt.-% of component a) consisting of:
      a1) 20 to 80 wt.-% of at least one star-shaped block copolymer A according to claim 1, and
      a2) 80 to 20 wt.-% of at least one star-shaped block copolymer B, which has
      short branches of structure $S_e$-$(B/S)_B$ and at least one long branch of structure $(B/S)_{Ae}$-$S_i$-$(B/S)_B$, linked by way of the blocks $(B/S)_B$, or
      short branches of structure $S_e$-$(B/S)_B$-$S_s$ and at least one long branch of structure $(B/S)_{Ae}$-$S_i$-$(B/S)_B$-$S_s$; linked by way of the blocks $S_s$;
      wherein the polymer blocks $S_e$ and $S_i$ are identical; the polymer blocks $S_e$, $S_i$, and $S_s$ are made from 95 to 100 wt.-% of vinylaromatic monomers and of from 0 to 5 wt.-% of dienes; the copolymer block $(B/S)_{Ae}$ is made from 65 to 95 wt.-% vinylaromatic monomers and 35 to 5 wt.-% dienes and has a glass transition temperature $Tg_A$ in the range from 40 to 90° C.; and the copolymer blocks $(B/S)_B$ are each made from 20 to 60 wt.-% vinylaromatic monomers and 80 to 40 wt.-% dienes and have a glass transition temperature $Tg_B$ in the range from −80° to 0° C.;
   b) 0 to 55 wt.-% of at least one further thermoplastic polymer other than block copolymers A and B;
   c) 0 to 0.8 wt.-% of at least one plasticizer; and
   d) 0 to 3 wt.-% of at least one further additive or processing aid different from c);
   where the total amount of components (a) and, if appropriate, (b), (c), and (d) is 100% by weight and the glass transition temperature Tg is determined by DSC based on DIN EN ISO 11357-2:2014-07, with evaluation of the 2nd heating cycle after quick cooling from 180° C. with a heating rate of 20 K/min.

10. The polymer composition according to claim 9 comprising 0.10 to 0.80 wt.-% of component c).

11. The polymer composition according to claim 9, wherein the number-average molar mass Mn of the copolymer block $(B/S)_{Ae}$ of block copolymer B is in the range from 30000 to 100000 g/mol.

12. The polymer composition according to claim 9, wherein the blocks Se and Si have a number-average molar mass Mn in the range from 5000 to 30000 g/mol.

13. The polymer composition according to claim 9, wherein the number-average molar mass Mn of the copolymer blocks $(B/S)_B$ is in the range of from 5000 to 40000 g/mol.

14. The polymer composition according to claim 9, wherein the number average molar mass Mn of the block $S_s$ is lower than 2500 g/mol.

15. The polymer composition according to claim 9, wherein the copolymer blocks $(B/S)_{Ae}$ and $(B/S)_B$ are composed of polymerized vinylaromatic monomers and of dienes with random distribution.

16. The polymer composition according to claim 9, wherein the proportion of the entirety of all of the blocks $(B/S)_B$ or $(B/S)_B$-$S_s$ of the star-shaped block copolymer B is from 30 to 37 wt.-%, based on the entire star-shaped block copolymer B.

17. The polymer composition according to claim 9, wherein the star-shaped block copolymers B have the following structures:

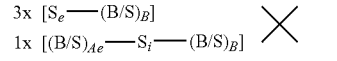

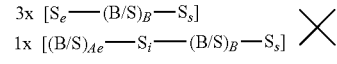

where $S_e$, $S_i$, $S_s$, $(B/S)_{Ae}$ and $(B/S)_B$ are as defined above and X is a coupling center, which is formed by reaction of the living anionic polymer chain ends with a polyfunctional coupling agent.

18. A process for the preparation of the polymer composition according to claim 9 by melt mixing of component a) and optional components b), c), and d) by aid of a mixing apparatus at a temperature in the range of from 160° C. to 300° C.

19. A method of using the polymer composition according to claim 9 for the production of films.

20. Shrink film produced from the polymer composition according to claim 9.

* * * * *